June 1, 1965  A. A. BURRELL  3,186,248
BELT AND SPLICE THEREFOR
Filed March 11, 1963
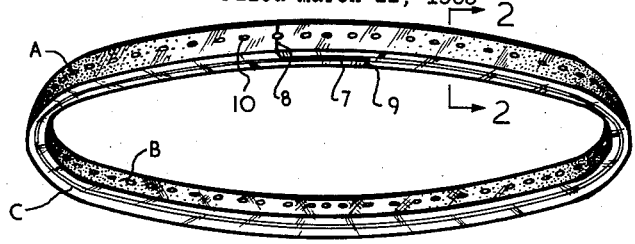
FIG. 1.
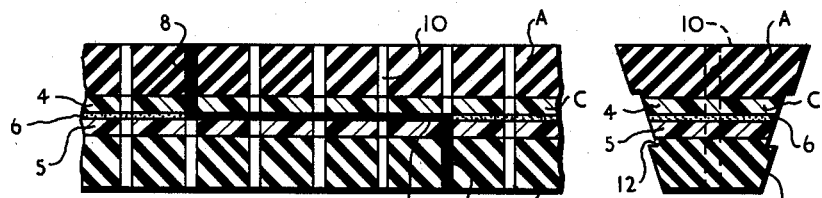
FIG. 3.
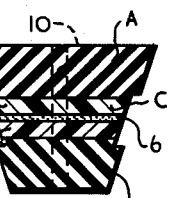
FIG. 2.
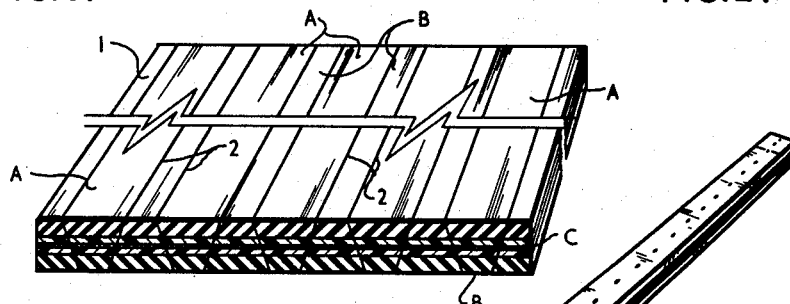
FIG. 4.
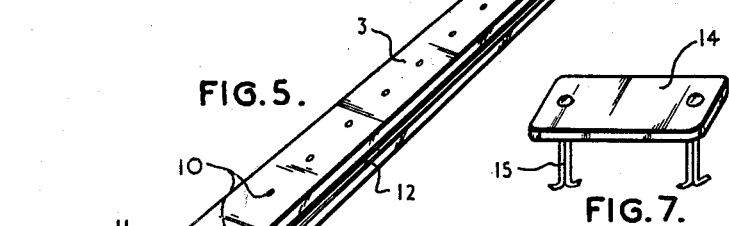
FIG. 5.
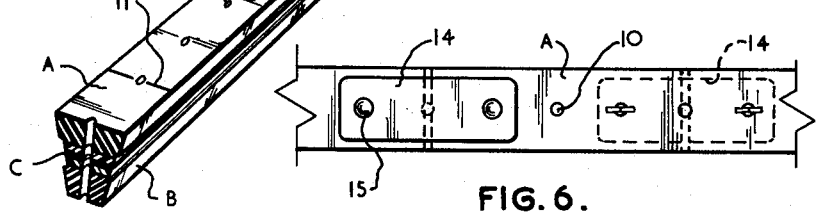
FIG. 7.
FIG. 6.
INVENTOR
ALFRED A. BURRELL
ATTORNEY United States Patent Office 3,186,248
Patented June 1, 1965

3,186,248
BELT AND SPLICE THEREFOR
Alfred A. Burrell, 10323 106th St., Edmonton,
Alberta, Canada
Filed Mar. 11, 1963, Ser. No. 264,190
7 Claims. (Cl. 74—233)

This invention relates to improvements in a belt, especially one of the so-called V-type.

Some belts are molded as one-piece endless belts and others are formed of a length of belting with the ends joined or spliced in some way. Common practice is to build one-piece endless belts on a drum, layer upon layer and cut the wide unit into a number of narrow individual belt bodies then cover and vulcanize them in suitable molds. This method of slitting the wide drum-assembled unit involves substantial waste and furthermore it has been found that structural changes such as uncontrollable shrinkage not infrequently occur during the vulcanizing so this method leaves much to be desired. On the other hand, the formation of a belt from a strip of belt stock of trapezoidal or tuncated V cross section requires a joint or splice of some kind which heretofore has presented a serious and unsolved obstacle in that the joint lacked strength, introduced a flexible variance, increased weight or dimension or included some other unwanted characteristic.

My invention contemplates a belt formed from a measured length of a special belt material with the ends united in an ingenious stepped splice.

An object of the invention is to provide a V belt having an outer tension section and an inner compression section with a novel central or intermediate so-called neutral axis section especially designed for splicing.

A further object is to provide a V belt in which the load-bearing neutral axis section includes a wide, flat, inert and relatively non-stretchable ribbon.

A further object is to provide a spliced V belt in which the inextensible neutral axis section is actually formed of not one but a pair of wide flat ribbons of high tensile strength positioned one above the other and spaced apart by a thin separating or filler tissue.

A further object of the invention is to provde a spliced V belt in which the primary load-bearing, neutral axis section is designed for bonding in a stepped splice or joint to provide maximum strength, stretch resistance and stability and being of a wide flat ribbon form overcomes the frailty and deficiencies of the common corded type of load-carrying neutral axis section belts.

A further object of the invention is to provide a V belt formed of a measured length of belting material with a load-carrying ribbon of high tensile strength embodied in its neutral axis section whose overlapping end portions are bonded in a stepped joint or splice, thereby enabling production of a belt of the exact predetermined length desired.

A further object of the invention is to provide a V belt formed of belting material having a row of small perforations extending vertically therethrough along the longitudinal median, the holes being located at measured centers such as a half inch or one inch apart and having a transverse mark running across each 24th or 12th hole, as the case may be, to indicate a one foot measurement.

A further object of the invention is to provide a V belt having a stepped or overlapped splice connection between the ends of the belting material that may employ mechanical connectors for bridging the abutting ends of the joint on the top or bottom of the belt or both.

To the accomplishment of the foregoing and related objects, the invention resides in the construction, combination and arrangement of parts as shall be hereinafter more fully described, illustrated in the accompanying drawings and specifiaclly set forth in the appended claims.

The invention will be best understood and can be more clearly described when reference is had to the drawings forming a part of this disclosure wherein like characters indicate like parts throughout the several views.

In the drawings:

FIGURE 1 is an elevation of a belt constructed according to this invention;

FIGURE 2 is an enlarged transverse vertical section therethrough, as taken on line 2—2 of FIGURE 1, looking in the direction indicated by the arrows;

FIGURE 3 is a similarly enlarged, longitudinal vertical section through the splice;

FIGURE 4 is a perspective view of a flat elongated slab of belting material from which the strips of V belting are cut;

FIGURE 5 is a perspective view of one such strip of V belt material, provided with a row of vertical holes at one-half inch centers and with each linear foot designated with a transverse mark;

FIGURE 6 is a plan view of a splice in which the abutting ends of the stepped joint are bridged with easily applied mechanical connectors; and FIG. 7 is a perspective view of such a mechanical bridge connector.

In the fabrication of endless belts in the usual way from a drum-based sleeve, that is progressively wrapped and then cured under pressure, there can be substantial variations such as undeterminable shrinkage during the vulcanization and other unwanted variables occur in the manufacturing process as to render it difficult if not impossible to produce a belt of exact predetermined size and stable length. For this reason I concluded it was undesirable to form the belt of a strip of composite belt material of exact length, wherein the load-bearing neutral axis section included an inert, non-stretchable portion, provided the ends of the strip could be connected by a durable and flexible splice having a tensile strength comparable to the unbroken portion of the belt. These critical requirements of exact predetermined size, stable length and strong, durable and flexible splice are satisfied by the belt disclosed herein.

Referring now particularly to the drawings, it will be seen that the belting material comprises three main layers or sections, viz., an outer tension section A, an inner compression section B and a central or intermediate load-bearing neutral axis section C.

The tension and compression sections A and B are formed of any suitable material or synthetic material such as synthetic rubbers of the chloroprene polymer type e.g. neoprene and the buna type e.g. butadiene-styrene or butadiene-acrylic nitrile copolymers alone or in a woven body impregnated to provide a dense spongy body, fabricated in layers or one piece, being usually of an elastomeric, rubber-like nature and these sections are here shown as of the same material and of like thickness. This locates the inert, non-stretchable, load-bearing section C approximately midway of the depth of the belting material and allows of the formation of the composite belting material in slabs 1 as seen in FIGURE 4, and the economical slitting of the slab along the inclined lines 2 to provide the truncated V strips 3 from alternately inverted longitudinal portions thereof, thereby minimizing the waste.

To render the load-bearing or pull section of a V belt non-stretchable or relatively inextensible, it is customary to reinforce it with a plurality of longitudinally extending cords carried in a soft rubber body. These cords are known to float at times and cause distortion in the belt.

Transversely extending cords have been employed in various ways in different parts of the belt in an attempt to overcome other recognized weakness. In any case, the use of cords in the load-carrying portion of the belt is unsuitable in a spliced belt as it has been impossible to provide the necessary tensile strength in a joint where the cords are severed.

Accordingly, the neutral axis section C of the present belt includes a wide, flat, load-carrying ribbon of inert and relatively inextensible material such as a synthetic polyamide e.g. "nylon," "Dacron," a suitable polyethylene or like product that is capable of being effectively and securely connected or bonded together. Such a ribbon-like member, extending substantially the full width of the belt and located in the neutral axis area imparts a desirable and long-sought transverse stability to the belt but in the present case provides the basis for a satisfactory stepped splice of exceptional tensile strength.

In forming the longitudinally stepped joint or splice of the type shown in FIGURE 3, the wide, flat, load-carrying ribbon could be slit horizontally midway of its height for the width thereof to provide the confronting overlapped halves of the ribbon that are suitably connected or bonded together at the horizontal reach of the stepped splice but the accurate slitting of the ribbon could prove difficult. Hence I have considered it desirable to form the load-carrying ribbon of not single band but a pair of wide flat ribbons 4 and 5 of high tensile strength, running longitudinally of the belt and extending horizontally from side to side and spaced apart only by a thin separator or filler tissue 6. This thin layer 6 facilitates the accurate horizontal cutting or slicing of belting ends that connect at the splice and is preferably of a material able to form part of a unitary splice bond or be easily removed from the adjoining ribbon in the load-carrying section.

In splicing the belt, opposite ends of the strip 3 are each cut half way through, one from the upper wide side of the tension section A and the other from the lower narrow side of the compression section B, at a predetermined distance such as two inches from the end, and in doing so these vertical cuts sever only the nearest load-carrying ribbon 4 or 5 respectively. Then the ends of the belting material are slit horizontally through the filler tissue 6 to meet the vertical cuts and the severed pieces of belting removed. Thus are provided the perfectly formed complementary halves of the stepped splice shown in FIGURE 3 that are connected by a bond or weld 7 that securely unites the two inch overlapped portions of the load-carrying ribbons 4 and 5 together, bonds the abutting ends of each respective ribbon 4 and 5 and also unites the abutting ends of the tension section A and compression section B as shown at 8 and 9 respectively.

To facilitate measuring the belting and as an aid to joining or splicing the ends, the belting strips 3 are provided with a row of small perforations 10 extending vertically therethrough along the longitudinal median, being at measured centers of one-half inch and having a visible index such as the transverse mark 11 at each foot, obviously and desired size and spacing of the holes 10 and manner of marking linear feet or the like may be used.

To avoid the opposite edges of the load-carrying ribbon, whether in one strip or in a pair of tissue separated ribbon strips 4 and 5, coming in contact with the sloping sides of the V-groove of a pulley so as to lessen the desired frictional engagement of belt and pulley, the opposite sides of the V belt, for at least the full height of the load-carrying ribbon or ribbons in the neutral axis section are scarfed as by a channel or recess 12, illustrated clearly in FIGURE 2.

As there may be occasions when it is not necessary to fuse or adhesively bond the overlapped ribbons of the load-carrying section or when an emergency repair or belt replacement has to be made that does not allow time for bonding, a mechanical connector type bond can be employed such as the flat metal plate 14 having a pair of perforations spaced at one inch centers for accommodation of split pins 15. These plate connectors 14 are shown applied to an overlapped or stepped splice in FIGURE 6, one bridging the ends on the top of the tension section A and the other bridging the offset ends on the underside of the compression section B where the split pins 15 will be seen to register with the perforations 10. In some cases the lower connector may be dispensed with and there may be times when it is found desirable to employ a mechanical connector such as the plate 14, a flexible link or woven wire strap or the like, even when the splice is bonded. Alternative forms of fasteners may be used in place of the split pins 15.

While the tension and compression sections A and B have been described as formed of any of the conventional materials and constructions commonly used I do not wish to be limited as to the nature of their construction or composition and this is expressly true as regards the load-carrying portion C of the belt for besides using material and synthetic materials in the ribbon it may be found desirable to construct such wide, flat ribbons from assemblies of solid strips, or twisted, woven or coiled members depending on the purpose for which the belt is required, provided that the ends to be overlapped can be slit accurately without destroying the longitudinal continuity of the inextensive pull members and that the overlapped ends of such members can be securely bonded together. Such a belt may be used raw or coated or wrapped in a cover as will best adapt it to the use for which it is intended.

Shown and described herein is a splice of conventional stepped pattern with the longitudinally offset upper and lower cuts 8 and 9 being vertical relative to the horizontal intermediate bonded reach 7 and transversely of the belt at right angles to the longitudinal median. If desired, the opposite end cuts could be at an incline to the intermediate horizontal reach and/or at an angle to the longitudinal median.

From the foregoing description taken in connection with the accompanying drawings, it will be manifest that a V belt is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A V-type belt of composite belt material comprising three main layers namely a tension section, a compression section and an intermediate neutral axis section, wherein the neutral axis section has a load-carrying member consisting of two wide flat horizontal and separated ribbons of relatively inextensible bondable material with a thin filler tissue therebetween.

2. The device according to claim 1 comprising a strip of the composite belt material with the ends thereof overlapped in a stepped splice with the ribbons overlapped and in which overlapped ends of the respective ribbons and abutting ends of each ribbon are connected in a secure bond.

3. A V-type belt of composite belt material comprising three main layers namely a tension section, a compression section and an intermediate neutral axis section, wherein the neutral axis section has a load-carrying member consisting of two wide flat horizontal and separated ribbons of relatively inert inextensible bondable material with a thin filler tissue therebetween said load-carrying member extending substantially the full width of the belt.

4. A V-type belt of composite belt material comprising three main layers namely a tension section, a compression section and an intermediate neutral axis section, wherein the neutral axis section has a load-carrying member consisting of two wide flat ribbons of relatively inert inextensible bondable material with a thin filler tissue separator therebetween to facilitate slitting the flat ribbons apart, said load-carrying member being disposed midway of the height of the belt and extending horizontally for substantially the full width thereof.

5. The device according to claim 4, wherein the opposite sloping sides of the V belt are provided with a channel recess for at least the full height of the load-carrying member.

6. A V-type belt consisting of a strip of composite belt material comprising tension, neutral axis and compression sections, wherein the neutral axis section has a load-carrying portion including a pair of wide flat ribbons spaced one above the other with an intermediate filler therebetween to facilitate separation of the ribbons and a stepped splice in said belt in which the ends of said strip material overlap with the intermediate step of said splice occurring between the spaced ribbons so that the ends of the ribbons overlap for the length of the splice and wherein the overlapped ends of respective ribbons, the abutting ends of each ribbon and the confronting ends of the tension and compression sections longitudinally offset from each other are all connected in a secure bond.

7. A V-type belt according to claim 6 in which the abutting ends at one end of the splice step have a bridging connector secured thereto.

References Cited by the Examiner
UNITED STATES PATENTS

| | | | |
|---|---|---|---|
| 1,013,469 | 1/12 | Aufinson | 24—31 |
| 1,303,027 | 5/19 | Carr | 24—38 |
| 1,792,718 | 2/31 | Stoll | 24—31 |
| 2,017,291 | 10/35 | Pfleger | 74—233 |
| 2,516,779 | 7/50 | Lesesne | 74—233 X |
| 2,796,911 | 6/57 | Waugh | 156—142 |
| 2,995,176 | 8/61 | Waugh | 154—52.2 X |

DON A. WHITE, *Primary Examiner.*